(12) United States Patent
Reda et al.

(10) Patent No.: US 6,473,524 B1
(45) Date of Patent: Oct. 29, 2002

(54) OPTICAL OBJECT RECOGNITION METHOD AND SYSTEM

(75) Inventors: James R. Reda; Jens H. Jorgensen; Jeffrey P. Werlin, all of Rochester, NY (US)

(73) Assignee: Videk, Inc., Rochester, NY (US)

( * ) Notice: Subject to any disclaimer, the term of this patent is extended or adjusted under 35 U.S.C. 154(b) by 0 days.

(21) Appl. No.: 09/292,060

(22) Filed: Apr. 14, 1999

(51) Int. Cl.$^7$ ............................................... G06K 9/46
(52) U.S. Cl. .................. 382/195; 382/178; 382/190; 382/203; 382/292; 382/309; 382/321
(58) Field of Search ............................. 382/177–179, 382/190, 199, 203, 204, 309–311, 321; 358/405; 348/589; 235/437

(56) References Cited

U.S. PATENT DOCUMENTS

| | | |
|---|---|---|
| 4,797,941 A | 1/1989 | Lloyd et al. |
| 4,974,260 A * | 11/1990 | Rudak ..................... 382/311 |
| 5,150,425 A | 9/1992 | Martin et al. |
| 5,159,644 A | 10/1992 | Martin et al. |
| 5,204,914 A | 4/1993 | Mason et al. |
| 5,278,920 A | 1/1994 | Bernzott et al. |
| 5,321,768 A | 6/1994 | Fenrich et al. |
| 5,379,349 A | 1/1995 | Avi-Itzhak |
| 5,406,642 A | 4/1995 | Maruya |
| 5,428,692 A * | 6/1995 | Kuehl ..................... 382/204 |
| 5,434,930 A | 7/1995 | Shigeoka et al. |
| 5,465,309 A * | 11/1995 | Johnson .................. 382/229 |
| 5,479,533 A | 12/1995 | Tanaka |
| 5,530,775 A | 6/1996 | Avi-Itzhak |
| 5,539,841 A | 7/1996 | Huttenlocher et al. |
| 5,555,317 A | 9/1996 | Anderson |
| 5,559,898 A | 9/1996 | Avi-Itzhak |
| 5,712,922 A | 1/1998 | Loewenthal et al. |
| 5,745,559 A | 4/1998 | Uchiyama et al. |
| 5,754,751 A | 5/1998 | Smith et al. |
| 5,764,799 A | 6/1998 | Hong et al. |
| 5,848,190 A | 12/1998 | Kleehammer et al. |
| 5,850,466 A | 12/1998 | Schott |
| 6,212,299 B1 * | 4/2001 | Yuge ....................... 382/231 |

* cited by examiner

Primary Examiner—Jose L. Couso
Assistant Examiner—Gregory Desire
(74) Attorney, Agent, or Firm—Eugene Stephens & Associates

(57) ABSTRACT

An iterative application of an optical object recognition method, such as an OCR method, with enhancements and modifications yields improved speed and accuracy. In the exemplary embodiment, after an initial pass of the OCR method on a document image, unrecognized blobs are grouped into unknown regions to which the OCR method is applied via an analysis window. If the contents of the analysis window remain unrecognized at a starting position in a given unknown region, the window can be moved within the unknown region to provide more opportunities to recognize the unknown region's contents. Recognized characters are recorded, and the portions of the unknown regions in which they appeared are removed. This pass of the OCR method recognizes characters in blobs containing multiple characters. After all unknown regions have been analyzed, remaining unrecognized blobs are regrouped into new unknown regions according to particular relationships, such as spatial or spectral relationship, and predetermined criteria, such as relative distance or frequency distribution. The OCR method is then applied to the new unknown regions. This pass of the OCR method recognizes characters that have been split into multiple blobs.

49 Claims, 6 Drawing Sheets

Unknown Region 5

Unknown Region 5

OPTICAL OBJECT RECOGNITION METHOD AND SYSTEM

TECHNICAL FIELD

The invention relates to optical object recognition (OOR), particularly to optical character recognition (OCR), and post-processing techniques therefor. The invention particularly concerns optical character recognition (OCR) systems that receive an image of a document, separate the image into blobs that contain characters, and analyze the blobs to recognize and extract characters from the blobs.

BACKGROUND OF THE INVENTION

Current OCR systems use a variety of approaches including template matching, statistical correlation, and font mapping. They typically perform an initial OCR in which the systems break a document image into blobs containing images of characters, try to recognize and extract the characters, and present the recognized characters in their original order. Unfortunately, the initial OCR leaves many unrecognized blobs that each contain more than one character or that contain fragments of characters.

We consider OCR systems a subset of a more general category we call "optical object recognition (OOR)" systems, where document images are arrays of data to be analyzed, characters are the particular objects recognized, and the blobs are "elements" of the arrays of data to be analyzed. For simplicity, we discuss our invention and practice and describe the exemplary embodiment of our invention in terms of OCR systems. Our preferred initial OCR method also leaves such unrecognized blobs after a first pass. As applied to text recognition, the initial OCR routine assumes that each blob is an individual character in a known font set, a set that the routine has been taught in one manner or another before it is run. This assumption fails in two situations: when the OCR routine cannot distinguish two or more characters by their spatial characteristics and thus merge the characters into one blob; and when the OCR routine misinterprets a character's spatial characteristics and splits it among two or more blobs. The first situation typically arises when there is inadequate spacing between characters, as illustrated in FIGS. 1 and 3–6. In FIGS. 4 and 5, Blobs 1, 2, 3, and 5 contain single characters that the OCR will handle with no problem. However, in FIGS. 4 and 6, Blob 4 includes "345", Blob 6 includes "78", and Blob 7 includes "90", none of which will be recognized because of the merger of multiple characters therein into single blobs. The second situation typically arises when there is unusual formatting (italics, perhaps), an unusual font (such as MICR as shown in the bottom row of FIGS. 2 and 7 with conventional font equivalents above), or light printing. In the case of the MICR characters of FIG. 2, the OCR routine will likely split each character into three blobs, none of which will be recognized. Thus, as shown in FIG. 7, the OCR routine will place the more conventional characters of the top row into individual Blobs 8, 12, 16, and 20, but will split their MICR equivalents in the bottom row into multiple Blobs 9–11, 13–15, 17–19, and 21–23. Our initial OCR routine locates and determines the sizes of blobs in a region of interest (ROI) in an image of a document that are to be recognized by the OCR routine.

To reduce the number of unrecognized blobs, many current OCR systems include post-processing routines that take another look at blobs left by the initial OCR. These post-processing systems reduce the number of unrecognized blobs, but still have lower than desired success rates and suffer from a lack of robustness. Thus, a need exists for a more robust OCR system and method that can separate and recognize characters that are not distinguishable by their spatial characteristics with a higher success rate than current OCR systems and methods. Another need exists for a more robust OCR system and method that can recognize characters that would ordinarily be left unrecognized because of unusual spatial characteristics leading prior art OCR systems and method to break the characters into multiple blobs.

SUMMARY OF THE INVENTION

Our invention satisfies this need using an improvement on existing OCR methods; the invention applies OCR to a document iteratively to simplify, strengthen, improve, and accelerate analysis as compared to prior art methods. Our improvement lies in the application of a post-processing routine that analyzes the blobs left unrecognized after the initial OCR routine is done. First, the post-processing routine breaks the ROI into unknown regions. Next, the routine analyzes each unknown region separately by attempting a correlation of the unknown region with a character from the known font set, starting at the upper left corner of the unknown region. In other words, the system has a set of character templates from the known font set and it uses a correlation coefficient between a current unknown character and each of the set of character templates to see how well it matches the templates. If there is a good match, the unknown region size is reduced by the width of the recognized character and the correlation is attempted again on the reduced unknown region. This is repeated until the entire unknown region is recognized or until every character in the font set has been tried. A variation of the correlation sequence moves the template around in the unknown region rather than only trying the upper left corner. When this method is applied to merged characters, the post-OCR analysis recognizes the individual characters contained in the blobs not recognized by the initial OCR. Once this is complete, the recognized characters are reordered to reflect their arrangement in the original image.

Our method then regroups unrecognized blobs left by the merged character analysis into new unknown regions for another pass of the OCR routine. Leftover blobs that meet predetermined criteria, such as having particular spatial relationships, and which meet the conditions of an unknown region as defined in the merged character recognition routine are placed into the unknown regions. Once the routine defines the unknown regions, it applies OCR to recognize characters that have been split among two or more blobs.

We prefer to use an adaptive learning routine for sequencing the order in which characters are correlated in our new routine. This causes the system to correlate a character according to the probability that a character is merged into another character. This probability is based on the frequency of observed mergings of each character in the observed font set. The character with the highest probability value is tried first in the correlation sequence of the new routine.

OCR with our improved method enjoys accuracies at least as high as prior art methods and is more robust to boot.

DESCRIPTION OF THE INVENTION

While we describe our invention in terms of OCR of text from scanned documents, we envision other uses for our invention. In its broadest terms, our invention is an optical object recognition system that uses an optical object recognition (OOR) method and routine iteratively on an array of data to more accurately and more robustly recognize objects appearing in the array of data. The OOR routine parses the array of data into elements before or as part of the first pass at recognition, the elements being blobs in the case of OCR. In our exemplary embodiment, the array of data is an image of a document and the objects recognized are characters in the document image so that the OOR is an OCR. The types of objects that could be recognized in OOR are diverse and could even include three-dimensional objects. Our invention is preferably implemented in a system that has a computer including a processor and a memory; an output device, such as a printer, display, or mass storage device to which the system can send a data file; and some means to require the array of data to be analyzed, such as a mass storage device from which the system can retrieve or receive a data file including the array of data or an input device, such as a scanner, from which the system can receive the array of data.

Figure 1:
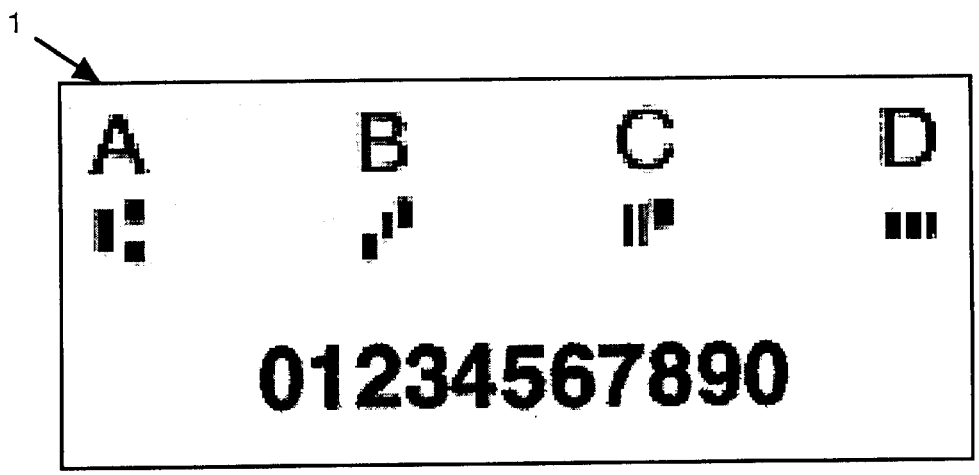
FIG. 1 shows a sample portion of a scanned document including a region of interest under analysis by the invention.
Figure 2:
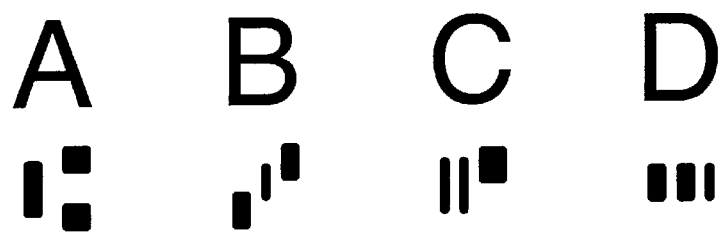
FIG. 2 shows in the bottom row a type of font (MICR) that will almost certainly yield split characters. The top row shows the conventional equivalent of the MICR symbols in the bottom row.
Figure 3:
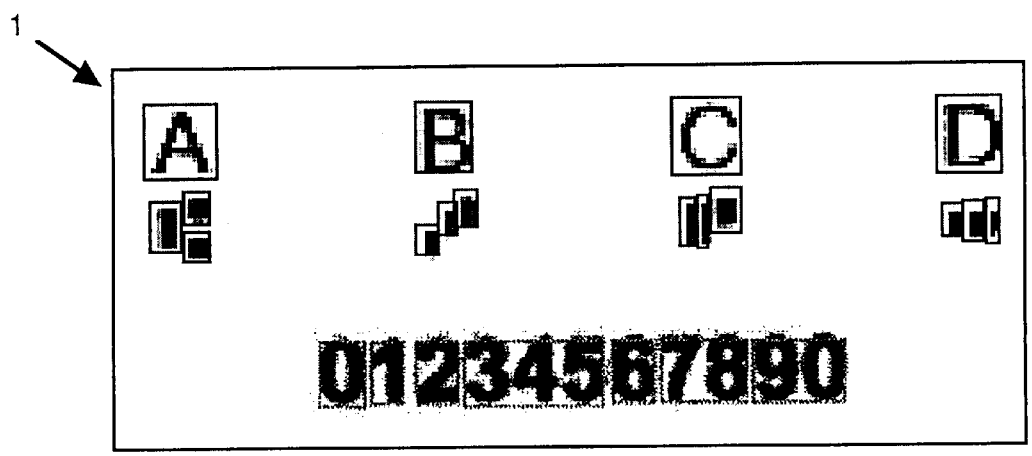
FIG. 3 shows how the initial pass of the OCR routine places what it believes to be characters in the region of interest of FIG. 1 into blobs.
Figure 4:
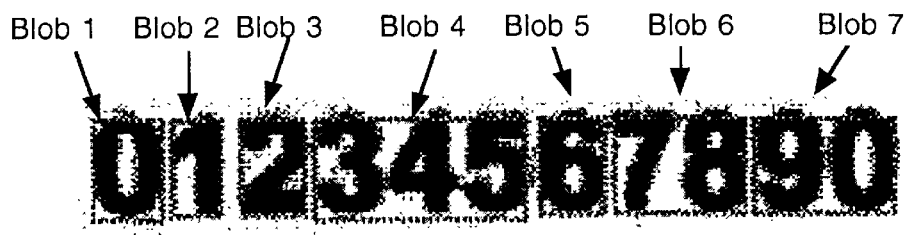
FIG. 4 shows the bottom portion of the region of interest of FIG. 1 divided into seven blobs, some of which contain merged characters.
Figure 5:
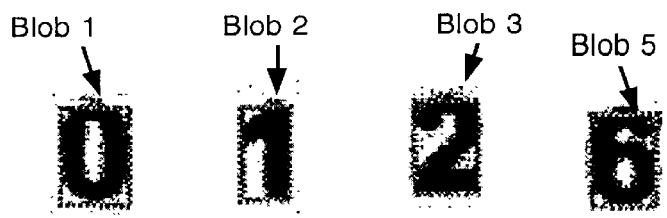
FIG. 5 shows single character containing blobs from FIGS. 1, 3, and 4.

Our invention preferably begins by acquiring or otherwise receiving an image of a document, such as that shown in FIG. 1, and identifying blobs in a region of interest 1 of the image as shown in FIG. 3. Identification of the blobs can be achieved by, for example, parsing the image to identify the blobs according to quantities of "white space" between "dark" areas of the image as is known in the art. The criteria used for blob identification yield single characters in the bulk of the blobs, but leave some characters in groups within individual blobs and split other characters among two or more blobs as discussed above and as can be seen in FIGS. 1–7. The particular criteria applied in the initial pass preferably include spatial characteristics of the blobs, such as spacing between substantially contiguous "dark" areas of the image or positional relationships between blobs. The criteria could also include spectral, gray level, intensity, luminance, or other criteria depending on the particular type of objects the invention is to recognize.

Figure 6:
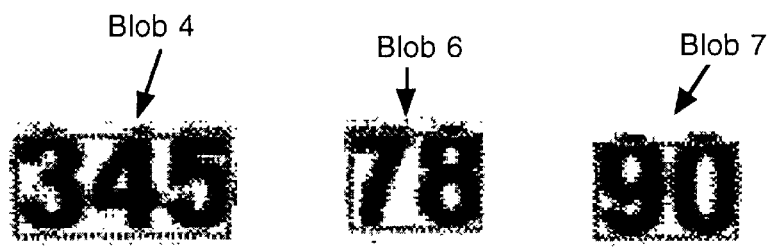
FIG. 6 shows merged character containing blobs from FIGS. 1, 3, and 4.
Figure 7:
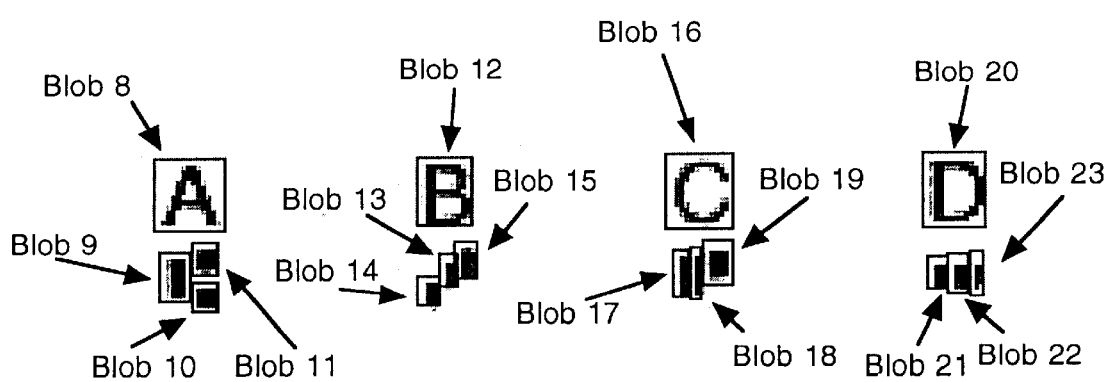
FIG. 7 shows the characters of FIG. 2 and of the top portions of FIGS. 1 and 3 after they have been placed into blobs.
Figure 8:
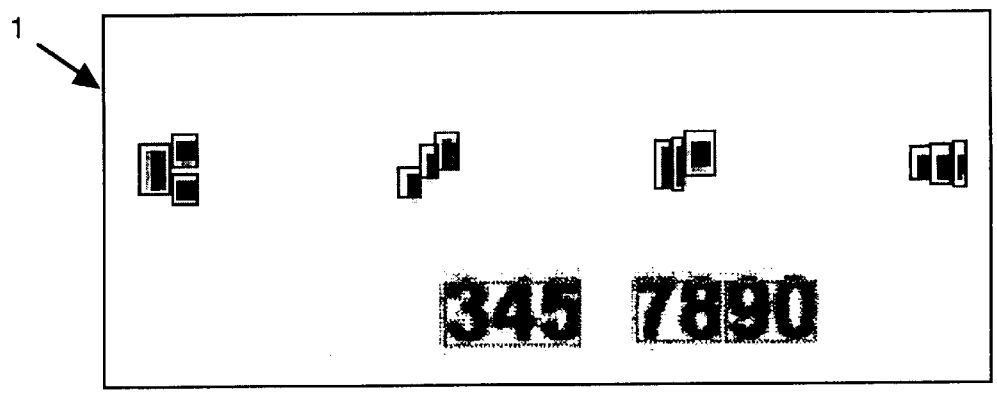
FIG. 8 shows blobs left behind in the region of interest of FIG. 3 after the initial pass of the OCR routine.
Figure 9:
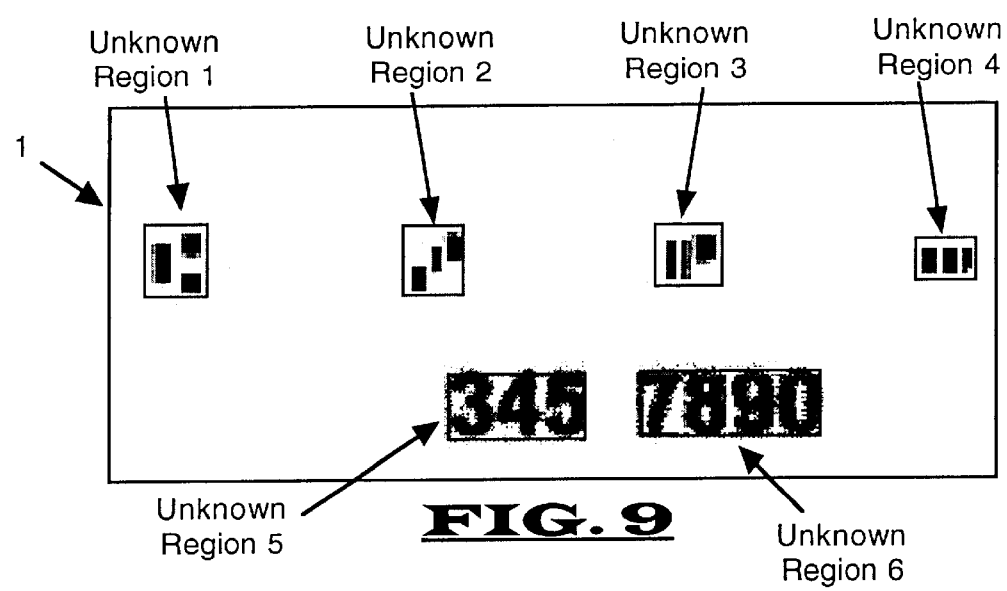
FIG. 9 shows how the blobs in the region of interest of FIG. 8 are grouped into unknown regions by the invention before the second application of the OCR method.
Figure 10:
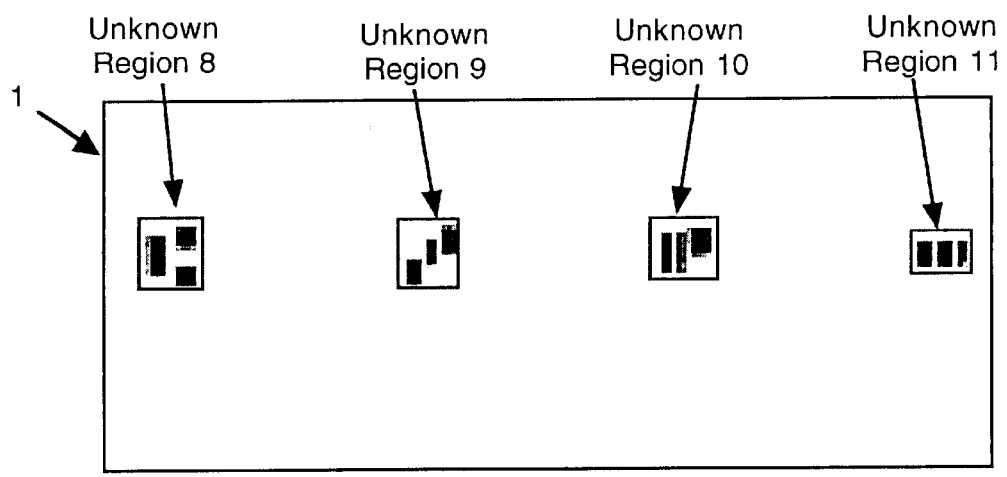
FIG. 10 shows blobs in the region of interest of FIG. 9 left behind by the second application of the OCR routine and regrouped into new unknown regions.
Figure 14:
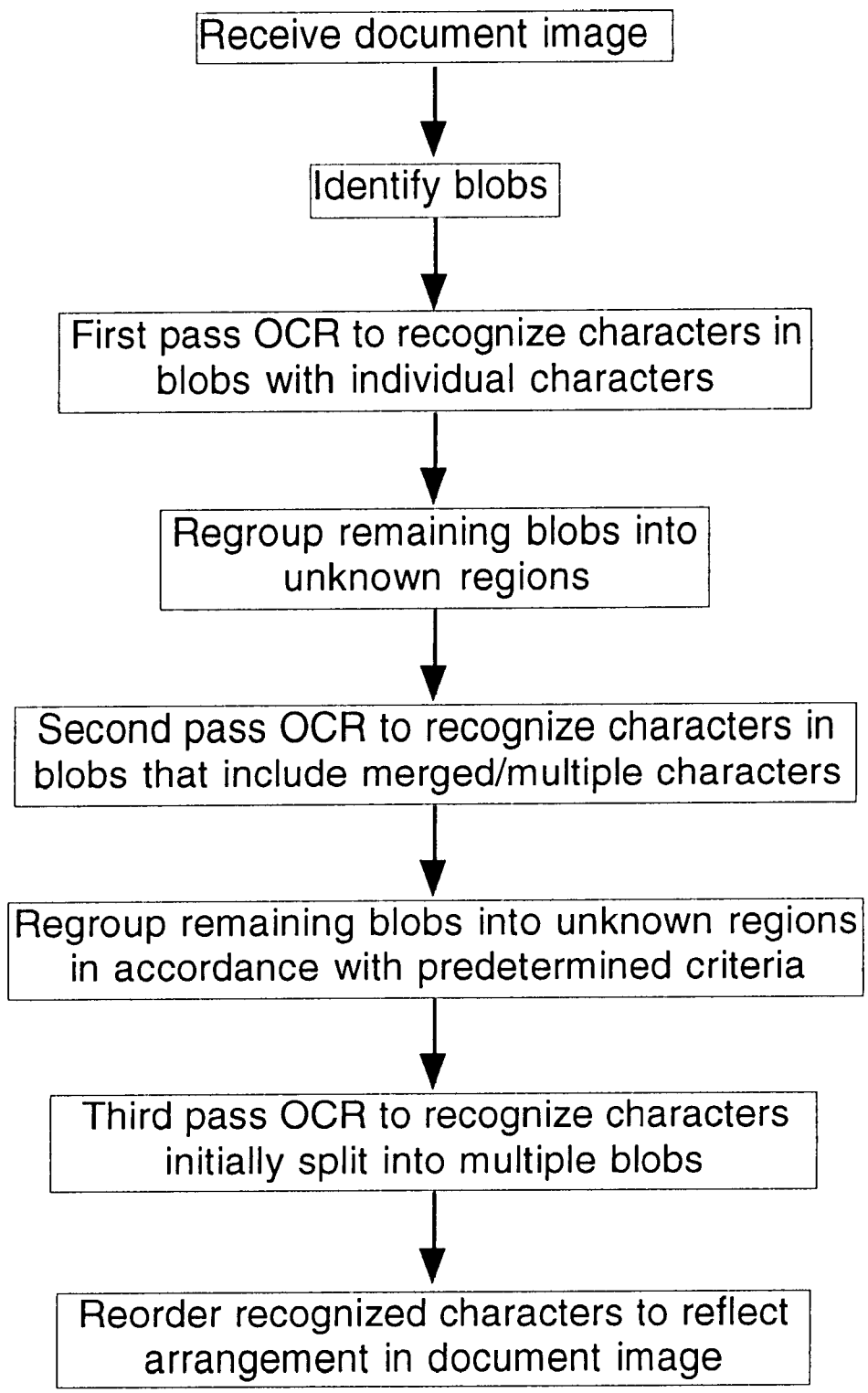
FIG. 14 is a schematic representation of the operation of the invention.
Figure 15:
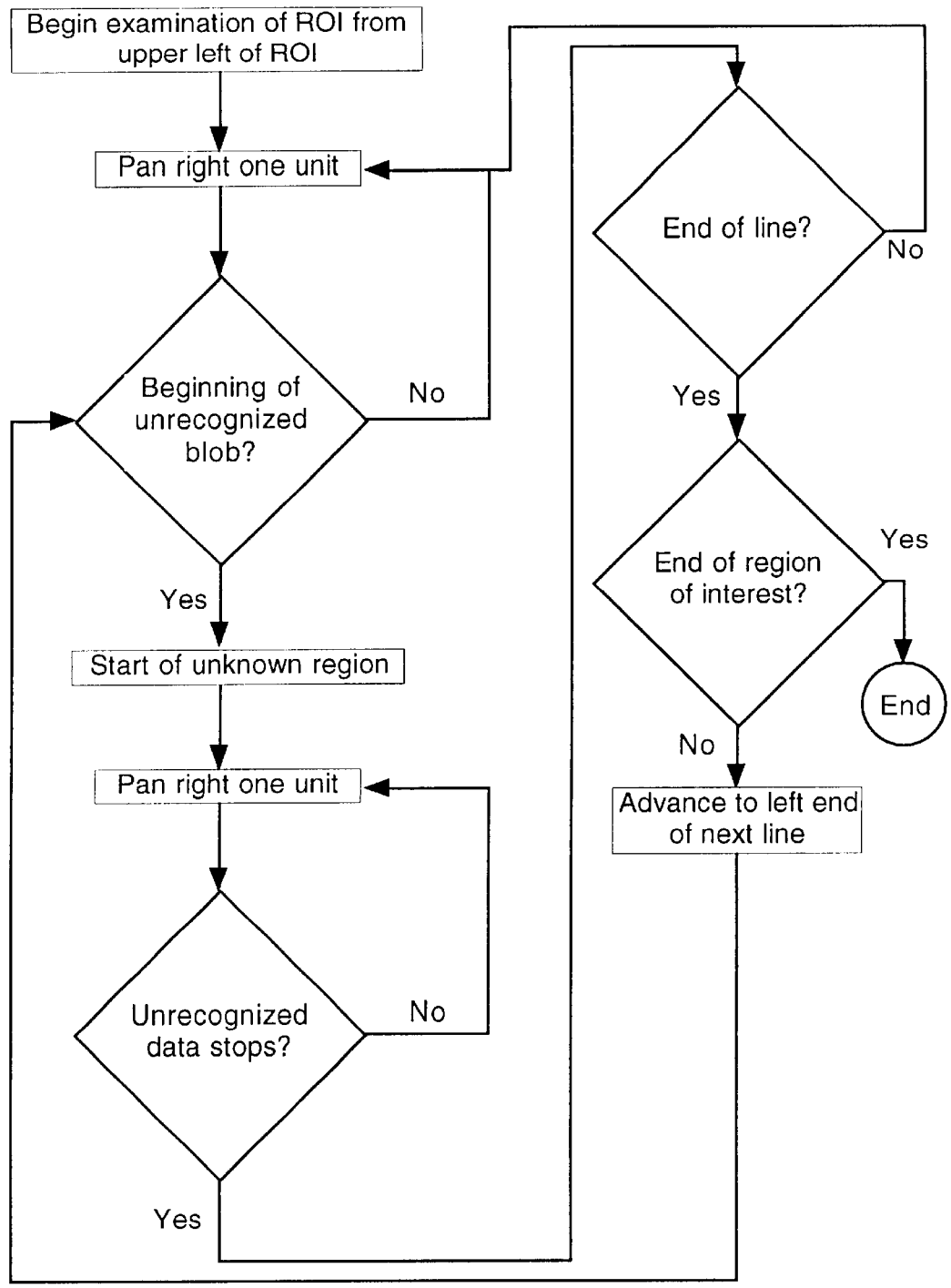
FIG. 15 is a schematic representation in flowchart format of the unknown region defining routine of the invention.

After blob identification, our invention performs an initial pass with an OCR method, such as that described in U.S. Pat. Nos. 5,150,425; 5,159,644; and 5,204,914, the disclosures of which are hereby incorporated by reference. The initial pass finds and recognizes substantially all single characters in respective blobs, but leaves unrecognized blobs containing merged and/or split characters, as shown in FIGS. 6 and 8. As reflected in the schematic representations of FIGS. 14 and 15, our invention divides the remnants of the initial pass into unknown regions, the effects of which are shown in FIG. 9. Preferably, the unknown region defining routine analyzes the region of interest 1 from left to right and line by line, applies the OCR method to the unknown regions to recognize merged characters, and then repeats these steps to recognize split characters.

An unknown region extends from a beginning of an unrecognized blob to a point at which unrecognized data stops and includes substantially contiguous data between these points along a first dimension of the unknown region. A second dimension of the unknown region is determined by a value of the contents of the unknown region along the second dimension. In a document image to which the exemplary embodiment of the invention is applied, this first dimension is the width of the unknown region; the second dimension is the height of the unknown region and is preferably substantially equal to the height of the tallest blob of the unknown region. Thus, beginning on the first line of the image that includes unrecognized blobs and with particular reference to FIG. 15, the preferred embodiment of our invention effectively starts at the left of the line and moves right until it encounters the start of an unrecognized blob, at which point an unknown region also begins. The invention then proceeds to the right until unrecognized data ends, the line ends, or both, at which point the unknown region ends. If the end of the unknown region does not coincide with the end of the line, the invention proceeds to the right, looking for the beginning of another unrecognized blob that defines the beginning of another unknown region. When the routine encounters the end of a line, it advances to the left of the next line, unless the end of the line is also the end of the unknown region, in which case the routine ends. As mentioned above, the heights of the unknown regions are the heights of the tallest of their contents. The unknown regions are preferably rectangular.

The manner in which our invention defines unknown regions remains essentially the same for recognizing merged characters and recognizing split characters. However, after merged character recognition, the blobs are grouped into new unknown regions according to relationships between the blobs if the relationships meet predetermined criteria. As with the parsing of the image into blobs, the particular relationships considered between the blobs can include spatial, spectral, intensity, gray level, and other relationships. Preferably, the relationship used in the regrouping of the blobs into new unknown regions is spatial and the predetermined criteria include a limitation that no blobs can have existed between two or more unrecognized blobs for them to be placed into one unknown region. This preferred spatial relationship and limitation of the predetermined criteria assume that, since no blobs appeared between the unrecognized blobs, each blob probably contains part of a single character. Grouping can be done for horizontally adjacent blobs and for vertically adjacent blobs to further improve recognition of split characters. Thus, as seen in the case of MICR characters in FIGS. 2 and 7–10, if the initial OCR splits a character into lower and upper parts and places the parts in respective blobs, neither of which are recognized in the first two passes of the OCR method, then the two parts can be rejoined at this point and the character can potentially be recognized. Once the unrecognized blobs are regrouped into new unknown regions, the OCR method is applied.

Figure 11:
FIG. 11 shows a starting point of an analysis window of the invention in a particular unknown region of FIG. 9.
Figure 12:
FIG. 12 shows the unknown region of FIG. 11 after a character has been recognized, its image has been removed from the unknown region, and the analysis window has been moved to a new location within the unknown region.
Figure 13:
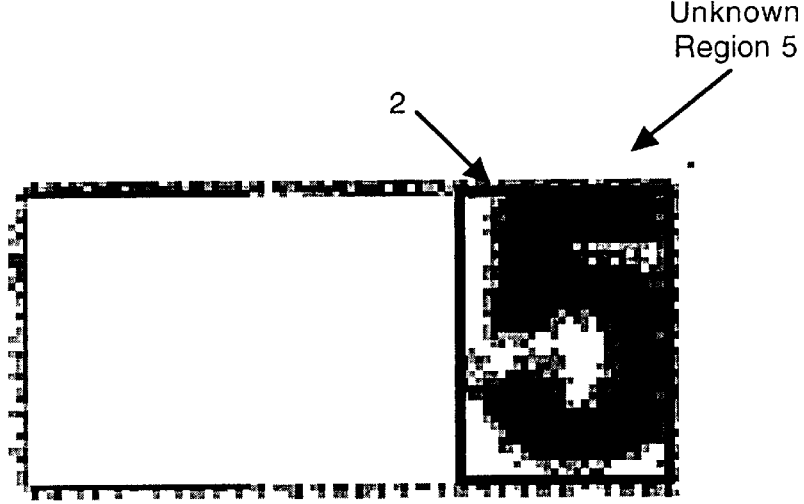
FIG. 13 shows the unknown region of FIG. 12 after another character has been recognized, its image has been removed from the unknown region, and the analysis window has been moved to a new location within the unknown region.

The application of the OCR method to each unknown region includes placing an analysis window at a start point in the unknown region, preferably so that an upper left corner of the analysis window coincides with the upper left corner of the unknown region. FIGS. 11–13 show an analysis window being used by the invention to recognize merged characters in Unknown Region 5, which includes Blob 4 of FIGS. 4 and 6. If the invention recognizes a character in the analysis window, then it records the recognized character, preferably in a memory; removes the portion of the unknown region encompassed by the analysis window; and tries again with the remaining portion of the unknown region as long as enough of the unknown region remains as shown in FIG. 12 after the "3" has been recognized, and again in FIG. 13 after the "4" has been recognized. We prefer to include a routine that will move the analysis window around the unknown region if placement in the upper left corner does not result in character recognition. Thus, if the "3" were not recognized in the initial application of the analysis window to the unknown region, the routine would iteratively increment the position of the analysis window to the right and/or down until a character was recognized or until substantially the entire unknown region had been analyzed. The analysis window size preferably depends on the sizes of the blobs identified at the beginning of the OCR process.

If unrecognized blobs remain, then the system preferably terminates the iterative OCR application and records or displays the remaining unrecognized blobs. Alternatively, the system could perform additional iterations, regrouping the blobs into unknown regions and applying OCR to the unknown regions. At some point, however, the system reaches a point of diminishing returns beyond which it makes little sense to continue.

While any suitable OCR routine can be used in our invention, we prefer to use the statistical correlation method of U.S. Pat. No. 5,150,425. The method of U.S. Pat. No. 5,150,425 first acquires a two-dimensional array of pixels, which we prefer to call an analysis window, from the region of interest. Then the method locates an unknown character in the analysis window and computes a correlation value $R_{xy}$ between the unknown character and each character of a trained set of characters (i.e., a font) using the formula $$R_{xy}^2 = \frac{[x_c^T y_c]^2}{[x_c^T x_c][y_c^T y_c]},$$

where the mean corrected character vectors, $x_c$, $y_c$, are given by $$x_c = x - \mu_x, \quad y_c = y - \mu_y, \text{ and}$$
$$x_c^T = [x_{c_1}, x_{c_2}, \ldots, x_{c_N}], \quad y_c^T = [y_{c_1}, y_{c_2}, \ldots, y_{c_N}].$$

The trained set of characters can be derived in various ways so long as the trained set of characters is a set of characters the OCR routine can use as a reference. For example, they can be trained from the document image; they can be retrieved from a storage device; they can be described by a set of mathematical functions, equations, or formulae; or they can be predefined by other suitable means. In the broader context of OOR, a trained set of objects is used as a reference and can be trained in much the same way as the trained set of characters for OCR. The OCR routine then recognizes the unknown character as the trained character with the highest correlation value above a threshold value. The correlation values can be weighted or non-weighted, depending upon the particular application and the particular anticipated needs of the user. If the correlation values are weighted, the method adjusts the weights in the correlation calculations to place more emphasis on those areas of a character that exhibit less noise, less emphasis on those areas of the character that exhibit more noise, and more emphasis on those areas of a trained character that distinguish it from all other trained characters in the training set. U.S. Pat. Nos. 5,159,644 and 5,204,914 describe methods for optimally and statistically adjusting these weights.

We claim:

1. An optical object recognition method applying a post-processing method to blobs parsed within a region of interest in an array of data and remaining after an initial pass of a recognition routine, the method including the steps of:
   (a). dividing the region of interest into unknown regions by:
      (i). locating and defining a first end point of a dimension of each unknown region as a beginning of an unrecognized blob including a portion of the array of data from the region of interest analyzed by an optical object recognition routine that yielded no recognized objects;
      (ii). locating and defining a second end point of the dimension of each respective unknown region as a point at which unrecognized data stops; and
      (iii). defining each unknown region as extending between respective first and second end points;
   (b). analyzing each unknown region with a modified optical object recognition method by:
      (i). placing an analysis window over a portion of the unknown region;
      (ii). performing a correlation between a contents of the analysis window and a reference set of objects to determine whether the analysis window contains a recognizable object;
      (iii). removing the contents of the analysis window from the unknown region if the analysis window contains a recognizable object and recording a recognized object;
      (iv). moving the analysis window over a new portion of the unknown region if a remaining portion of the unknown region is larger than a predetermined size; and (v). repeating steps (ii)–(iv) until the remaining portion of the unknown region is smaller than the predetermined size; and (c). repeating steps (a) and (b) until all unknown regions have been analyzed.

2. The method of claim 1 wherein the step of defining an unknown region further includes defining a second dimension of each unknown region according to a value of the second dimension possessed by an unrecognized blob that the unknown region includes.

3. The method of claim 1 wherein the step of dividing the region of interest into unknown regions further includes the steps of:

(i). determining a relationship between two unrecognized blobs;

(ii). determining whether the relationship meets predetermined criteria;

(iii). grouping the two unrecognized blobs into one unknown region if the relationship meets the predetermined criteria; and (iv). repeating steps (i) through (iii) until substantially all unrecognized blobs that can be grouped have been grouped.

4. The method of claim 3 wherein the relationship is a spatial relationship.

5. The method of claim 3 wherein the relationship is a spectral relationship.

6. The method of claim 1 wherein the analysis window includes an array of pixels from the unknown region.

7. The method of claim 6 wherein the array includes at least two dimensions.

8. The method of claim 1 wherein the array of data is an image of a document and the objects sought are characters of the document.

9. An optical object recognition method including the steps of:

(a). performing an initial OOR on a region of interest in an array of data;

(b). defining unrecognized blobs as portions of the region of interest containing substantially contiguous data from the array distinguished by yielding no recognized objects from the initial OOR;

(c). performing a first post-processing method on unrecognized blobs left from the initial OOR to separate objects from unrecognized blobs including more than one object;

(d). recognizing more than one object within at least one of the unrecognized blobs;

(e). performing a second post-processing method on unrecognized blobs left from the initial OOR and the first post-processing method to recognize objects split into multiple unrecognized blobs; and (f). recognizing at least one single object split between more than one of the unrecognized blobs.

10. The method of claim 9 wherein the first post-processing method includes the steps of:

(i). dividing the region of interest into unknown regions;

(ii). analyzing each unknown region with a modified optical object recognition method; and (iii). repeating steps (i) and (ii) until substantially all unknown regions have been analyzed.

11. The method of claim 9 wherein the first and second post-processing methods apply a modified OOR method to analyze the unrecognized blobs, the unrecognized blobs having been organized into unknown regions and the modified OOR method as applied to a given unknown region including the steps of:

(i). placing an analysis window over a portion of the unknown region;

(ii). attempting recognition of contents of the analysis window to determine whether the analysis window contains a recognizable object;

(iii). removing the contents of the analysis window from the unknown region if the analysis window contains a recognizable object and recording a recognized object;

(iv). moving the analysis window over a new portion of the unknown region if a remaining portion of the unknown region is larger than a predetermined size; and (v). repeating steps (ii) through (iv) until the remaining portion of the unknown region is smaller than a predetermined size.

12. The method of claim 11 wherein the analysis window includes an array of pixels from the unknown region.

13. The method of claim 12 wherein the array includes at least two dimensions.

14. The method of claim 11 wherein the step of attempting recognition of the contents of the analysis window includes performing a correlation of the current portion by:

(A). locating an unknown object in the analysis window;

(B). computing correlation values between the unknown object and each of a set of objects; and (C). recognizing the unknown object as an object of the set of objects with which the unknown object has a highest correlation value.

15. The method of claim 14 wherein the set of objects is a trained set of objects.

16. An optical object recognition method including the steps of:

(a). performing an initial OOR on a region of interest in an array of data;

(b). performing a first post-processing method on unrecognized blobs left from the initial OOR to separate objects from unrecognized blobs including more than one object;

(c). performing a second post-processing method on unrecognized blobs left from the initial OOR and the first post-processing method to recognize objects split into multiple unrecognized blobs;

(d). the first post-processing method including the steps of:

(i). dividing the region of interest into unknown regions;

(ii). analyzing each unknown region with a modified optical object recognition method; and (iii). repeating steps (i) and (ii) until substantially all unknown regions have been analyzed; and (e). the step of dividing the region of interest into unknown regions including the steps of:

(A). locating a first point that is a beginning of an unrecognized blob left over from an initial optical object recognition, the blob including a portion of array of data analyzed by the initial optical object recognition routine that yielded no recognized objects;

(B). locating a second point to a right of the beginning of the unrecognized blob that is a point at which unrecognized data ends;

(C). defining an unknown region as extending from the first point to the second point; and (D). repeating steps (A) through (C) until all unrecognized blobs of the image of the document are included in unknown regions.

17. The method of claim 16 wherein the step of defining an unknown region further includes defining a height of the unknown region as a height of an unrecognized blob it includes.

18. An optical object recognition method including the steps of:
   (a). performing an initial OOR on a region of interest in an array of data;
   (b). performing a first post-processing method on unrecognized blobs left from the initial OOR to separate objects from unrecognized blobs including more than one object;
   (c). performing a second post-processing method on unrecognized blobs left from the initial OOR and the first post-processing method to recognize objects split into multiple unrecognized blobs;
   (d). the second post-processing method including the steps of:
      (i). determining relationships between unrecognized blobs left over from an initial optical object recognition and the first post-processing method;
      (ii). dividing the region of interest into unknown regions by:
         (A). defining an unknown region as extending from a first point to a second point and including multiple unrecognized blobs when the relationships between the unrecognized blobs meet predetermined criteria;
         (B). the first point being a beginning of an unrecognized blob left over from an initial optical object recognition, the blob containing a portion of an array of data analyzed by the initial optical object recognition routine that yielded no recognized objects; and
         (C). the second point being a point at which unrecognized data ends; and
         (D). repeating steps (A) through (C) until substantially all unrecognized blobs in the region of interest have been grouped into unknown regions;
      (iii). analyzing each unknown region with a modified optical object recognition method; and
      (iv). repeating steps (i) through (iii) until substantially all unknown regions have been analyzed.

19. The method of claim 18 wherein the relationships determined are spatial relationships and the predetermined criteria include spatial characteristics of the unrecognized blobs.

20. The method of claim 18 wherein the relationships determined are spectral relationships and the predetermined criteria include spectral characteristics of the unrecognized blobs.

21. An optical object recognition method applying an OOR routine iteratively on a target document image including a region of interest, a first iteration of the OOR method leaving unrecognized blobs including portions of the target document image, the method including the steps of:
   (a). dividing the unrecognized blobs in the region of interest into unknown regions each occupying contiguous areas among the unrecognized blobs;
   (b). selecting one of the unknown regions in the region of interest;
   (c). analyzing the unknown region with the OOR routine via an analysis window;
   (d). removing a portion of the unknown region bounded by the analysis window if it includes a recognized object and recording any such recognized object in a memory;
   (e). determining if the remaining unknown region is still large enough to include an object;
   (f). moving the analysis window to a new part of the unknown region if the remaining unknown region is still large enough to include an object;
   (g). repeating steps (c) through (f) until the remaining unknown region is not large enough to include an object;
   (h). selecting another of the unknown regions in the region of interest for analysis; and
   (i). repeating steps (c) through (h) until substantially all of the unknown regions in the region of interest have been analyzed.

22. The method of claim 21 wherein the step of dividing the unrecognized blobs into the unknown regions includes the steps of:
   (i). locating a first point at which an unrecognized blob begins;
   (ii). locating a second point at which unrecognized data ends; and
   (iii). defining each of the unknown regions as extending between the first and second points.

23. The method of claim 21 including a further step of redividing the unrecognized blobs in the region of interest into new unknown regions that combine at least some of the remaining unknown regions according to predetermined criteria.

24. The method of claim 23 wherein the predetermined criteria include spatial characteristics of the blobs.

25. The method of claim 23 wherein the predetermined criteria include spectral characteristics of the blobs.

26. The method of claim 23 wherein the predetermined criteria include a condition that the two unrecognized blobs must be horizontally adjacent.

27. The method of claim 23 wherein the predetermined criteria include a condition that the two unrecognized blobs must be vertically adjacent.

28. The method of claim 21 wherein the OOR routine performs a method including the steps of:
   (i). calculating correlation values between contents of the analysis window and each of a set of objects;
   (ii). selecting an object of the set of objects corresponding to a highest of the correlation values as an object recognized in the contents of the analysis window; and
   (iii). defining the object as a recognized object.

29. An optical object recognition (OOR) system including a computer with a processor connected to a memory, the OOR system executing an OOR method including the steps of:
   (a). acquiring an array of data for analysis;
   (b). storing the array in the memory;
   (c). parsing a region of interest of the array into blobs to isolate as many individual objects in the image as possible into respective blobs;
   (d). performing OOR on the blobs to recognize as many of the objects in their respective blobs as possible;
   (e). removing any recognized objects and their respective blobs from the stored region of interest;
   (f). recording the recognized objects in the memory;
   (g). grouping any remaining blobs, characterized as unrecognized blobs, into unknown regions;

(h). performing OOR on each unknown region;

(i). removing any recognized objects from each unknown region;

(j). recording recognized objects in the memory;

(k). grouping any remaining unrecognized blobs into new unknown regions;

(l). performing OOR on each unknown region;

(m). removing any recognized objects in the memory;

(n). recording recognized objects in the memory;

(o). reordering recognized objects recorded in the memory in an order in which they appeared in the array of data; and (p). sending the reordered recognized objects to an output.

30. The system of claim 29 further including a display and wherein the step of sending the reordered recognized objects to an output includes sending them to the display.

31. The system of claim 29 further including a storage device and wherein the step of sending the reordered recognized objects to an output includes sending them to the storage device as a data file.

32. The system of claim 29 wherein the array of data is an image of a document and the objects recognized by the system and method are characters appearing on the document.

33. The system of claim 29 wherein the steps (g) and (k) of grouping any remaining blobs into unknown regions include the steps of:

(i). locating a beginning of an unrecognized blob;

(ii). defining a beginning of an unknown region as the beginning of the unrecognized blob;

(iii). locating a point at which unrecognized data stops;

(iv). defining an end of the unknown region as the point at which unrecognized data stops; and (v). repeating steps (i) through (iv) until substantially all unrecognized blobs in the region of interest have been grouped into unknown regions.

34. The system of claim 33 wherein the step (k) of grouping any remaining blobs into new unknown regions further includes the step of determining according to predetermined criteria whether multiple blobs should be grouped into one unknown region.

35. The system of claim 34 wherein the predetermined criteria include spatial characteristics of the blobs.

36. The system of claim 34 wherein the predetermined criteria include spectral characteristics of the blobs.

37. The system of claim 34 wherein the predetermined criteria include intensity data associated with the blobs.

38. The system of claim 33 wherein each unknown region includes a second dimension, the extent of which is determined by the objects they encompass.

39. The system of claim 38 wherein the unknown regions are rectangles whose heights are determined by steps (i) through (v) and whose heights are determined by a tallest of the objects each unknown region contains.

40. An optical object recognition method applying an OOR routine in a post-processing method to unrecognized blobs remaining from an initial OOR including the steps of:

(a). dividing the unrecognized blobs into unknown regions each including substantially contiguous unrecognized data between a beginning of an unrecognized blob and an end of unrecognized data;

(b). positioning an analysis window within each of the unknown regions;

(c). applying the OOR routine to examine contents of the analysis window;

(d). removing recognized objects from each of the unknown regions;

(e). determining if a remaining size of each of the unknown regions is large enough to contain an additional object;

(f). moving the analysis window to a new position within each of the unknown regions that are large enough to contain an additional object; and (g). repeating steps (c) to (f) until the size of each of the unknown regions is not large enough to contain an additional object.

41. The method of claim 40 wherein the OOR routine is an OCR routine seeking characters in an array of data representing an image of a document.

42. The method of claim 40 including a further step of:

redividing the unrecognized blobs into new unknown regions by combining the unknown regions that are not large enough to contain an additional object according to particular relationships between the unrecognized blobs.

43. The system of claim 42 wherein the particular relationships are spatial relationships.

44. The system of claim 42 wherein the particular relationships are spectral relationships.

45. The system of claim 42 wherein regrouping is further performed by defining each new unknown region as including substantially contiguous unrecognized data between the beginning of one of the unrecognized blobs and the end of the unrecognized data.

46. The system of claim 42 wherein the OOR routine uses statistical correlation between an unknown object and each of a set of objects.

47. The system of claim 46 wherein the set of objects is trained from the array of data.

48. The system of claim 46 wherein the set of objects is a pretrained set of objects stored in a memory prior to analysis of the array of data.

49. The system of claim 46 wherein the set of objects is based on a set of mathematical descriptions of object shapes.

* * * * *